United States Patent
Ying et al.

(10) Patent No.: US 10,880,744 B2
(45) Date of Patent: Dec. 29, 2020

(54) SECURITY NEGOTIATION METHOD, SECURITY FUNCTION ENTITY, CORE NETWORK ELEMENT, AND USER EQUIPMENT

(71) Applicant: Huawei Technologies Co., Ltd., Shenzhen (CN)

(72) Inventors: Jiangwei Ying, Beijing (CN); Yanmei Yang, Beijing (CN); Zhenglei Huang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/233,938

(22) Filed: Dec. 27, 2018

(65) Prior Publication Data

US 2019/0132735 A1 May 2, 2019

Related U.S. Application Data

(63) Continuation of application No. PCT/CN2016/099398, filed on Sep. 19, 2016.

(30) Foreign Application Priority Data

Jul. 1, 2016 (CN) .................. PCT/CN2016/088237

(51) Int. Cl.
*H04L 29/06* (2006.01)
*H04W 12/06* (2009.01)
(Continued)

(52) U.S. Cl.
CPC ........... *H04W 12/06* (2013.01); *H04L 9/0838* (2013.01); *H04L 9/32* (2013.01); *H04W 12/0401* (2019.01);
(Continued)

(58) Field of Classification Search
CPC ........ H04L 9/0838; H04L 9/32; H04W 12/06; H04W 12/04033; H04W 12/04; H04W 88/02
See application file for complete search history.

(56) References Cited

U.S. PATENT DOCUMENTS

| 2011/0047382 A1 | 2/2011 | Wang et al. |
| 2011/0320802 A1 | 12/2011 | Wang et al. |

(Continued)

FOREIGN PATENT DOCUMENTS

| CN | 101083839 A | 12/2007 |
| CN | 101102600 A | 1/2008 |

(Continued)

OTHER PUBLICATIONS

3GPP TR 22.864 V0.3.0 (Feb. 2016), 3rd Generation Partnership Project; Technical Specification Group Services and System Aspects; Feasibility Study on New Services and Markets Technology Enablers—Network Operation; Stage 1 (Release 14), 24 pages (Feb. 2016).

(Continued)

*Primary Examiner* — Joseph P Hirl
*Assistant Examiner* — Chi D Nguy
(74) *Attorney, Agent, or Firm* — Leydig, Voit & Mayer, Ltd.

(57) ABSTRACT

A security negotiation method includes: receiving, by a security function entity, an authentication request sent by a core network element, where the authentication request is generated by the core network element based on a request message of user equipment; performing, by the security function entity, Authentication and Key Agreement with the user equipment based on the authentication request, and generating a security parameter, where the security parameter includes a first key; receiving, by the security function entity, a key request sent by the core network element; and (Continued)

generating, by the security function entity, a security key between the core network element and the user equipment based on the key request and the first key. In the method, non-access stratum security for a 5G network architecture can be negotiated, thereby meeting a security requirement of a 5G network.

16 Claims, 14 Drawing Sheets

(51) Int. Cl.
*H04L 9/32* (2006.01)
*H04W 12/04* (2009.01)
*H04L 9/08* (2006.01)
*H04W 88/02* (2009.01)

(52) U.S. Cl.
CPC . *H04W 12/0407* (2019.01); *H04W 12/04031* (2019.01); *H04W 12/04033* (2019.01); *H04W 88/02* (2013.01)

(56) References Cited

U.S. PATENT DOCUMENTS

| | | | |
|---|---|---|---|
| 2014/0040620 A1 | 2/2014 | Kolesnikov et al. | |
| 2014/0071967 A1 | 3/2014 | Velasco | |
| 2017/0078874 A1* | 3/2017 | Lee | H04W 36/0055 |
| 2017/0111339 A1* | 4/2017 | Lee | H04L 9/0841 |
| 2018/0048465 A1* | 2/2018 | Schliwa-Bertling | G11B 20/0021 |
| 2018/0184297 A1* | 6/2018 | Mohamed | H04W 12/06 |
| 2019/0373461 A1* | 12/2019 | Ito | H04W 8/12 |

FOREIGN PATENT DOCUMENTS

| | | |
|---|---|---|
| CN | 101237444 A | 8/2008 |
| CN | 101257723 A | 9/2008 |
| CN | 101426190 A | 5/2009 |
| CN | 101977378 A | 2/2011 |
| CN | 102299797 A | 12/2011 |
| CN | 104935426 A | 9/2015 |
| CN | 108141754 A | 6/2018 |
| WO | 2016036296 A1 | 3/2016 |

OTHER PUBLICATIONS

CN/201910323474.2, Office Action, dated Mar. 20, 2020.
CN/201910323474, Office Action, filed Dec. 30, 2019.
"3rd Generation Partnership Project; Technical Specification Group Services and System Aspects; 3GPP System Architecture Evolution (SAE); Security architecture (Release 13)," 3GPP TS 33.401 V13.3.0, pp. 1-148, 3rd Generation Partnership Project, Valbonne, France (Jun. 2016).

\* cited by examiner

SECURITY NEGOTIATION METHOD, SECURITY FUNCTION ENTITY, CORE NETWORK ELEMENT, AND USER EQUIPMENT

CROSS-REFERENCE TO RELATED APPLICATIONS

This application is a continuation of International Application No. PCT/CN2016/099398, filed on Sep. 19, 2016, which claims priority to International Application No. PCT/CN2016/088237, filed on Jul. 1, 2016. The disclosures of the aforementioned applications are hereby incorporated by reference in their entireties.

TECHNICAL FIELD

The present invention relates to communications technologies, and in particular, to a security negotiation method, a security function entity, a core network element, and user equipment.

BACKGROUND

In a 3rd Generation Partnership Project (3GPP) network, attachment is a process in which user equipment (UE) registers, before performing a service, in the network. The UE can receive a service from the network only after the attachment succeeds. During the attachment, processes such as a security procedure, resource cleanup, registration update, and default bearer establishment are mainly completely. The security procedure mainly includes accessing Authentication and Key Agreement (AKA) and algorithm negotiation. The UE and the network negotiate a base key Kamse through an AKA process, and then complete algorithm negotiation based on the base Kasme and an algorithm identifier, thereby negotiating an integrity protection key and an encryption key. After this, integrity protection and encrypted protection are performed on signaling of interaction between the UE and the network by respectively using the negotiated integrity protection key and encryption key.

In a 4G Long Term Evolution (LTE) system, AKA and algorithm negotiation between UE and a network are performed through negotiation between the UE and a mobility management entity (MME). The MME is mainly responsible for all control plane functions of a user and session management, including non-access stratum (NAS) signaling and security, tracking area management, gateway selection, and the like. In other words, the MME is responsible for both mobility management and session management. Therefore, in a 4G network, each signaling interaction between the UE and the network is terminated in the MME. Therefore, the AKA and algorithm negotiation between the UE and the network need to be performed through only negotiation between the UE and the MME. Therefore, only an AKA and algorithm negotiation result needs to be negotiated.

However, in a 5G network, a mobility management function and a session management function of an original MME are implemented by different network entities. The 5G network is abstracted into different network slices. Each network slice includes control plane function (CPF) entities such as a mobility management (MM) function entity and a session management (SM) function entity, and a user plane function (UPF) entity. The 5G network includes a plurality of network slices, the plurality of network slices are independent of each other, and the MM and the SM in each network slice are independent. Therefore, in the 5G network, security isolation needs to be performed between different network slices and between the MM and the SM in each network slice, and respective AKA and algorithm negotiation results are used. The AKA in the 5G network may be different from that in the 4G network.

An AKA and algorithm negotiation result in the prior art is based on a negotiation result between UE and an MME. Therefore, an AKA and algorithm negotiation method in the prior art cannot meet a requirement of the 5G network.

SUMMARY

Embodiments of the present invention provide a security negotiation method, a security function entity, a core network element, and user equipment, to resolve the problem in the prior art.

A first aspect of the present invention provides a security negotiation method, including:
  receiving, by a security function entity, an authentication request sent by a core network element, where the authentication request is generated by the core network element based on a request message of user equipment UE;
  performing, by the security function entity, Authentication and Key Agreement with the UE based on the authentication request, and generating a security parameter, where the security parameter includes a first key;
  receiving, by the security function entity, a key request sent by the core network element; and
  generating, by the security function entity, a security key between the core network element and the UE based on the key request and the first key.

In a possible design, the security parameter further includes first identification information, where the first identification information is used to identify first security authentication between the UE and the security function entity.

In a possible design, the security parameter further includes first identification information, where the first identification information is used to identify first security authentication between the UE and the security function entity, and the first identification information includes address information of the security function entity corresponding to the first security authentication.

In a possible design, the method further includes:
  sending, by the security function entity, the first identification information to the UE.

In a possible design, the core network element includes a mobility management MM entity, a session management SM entity, a non-access stratum NAS proxy node, a slice selection function SSF, or a core network node. The core network node supports an MM function and an SM function.

In a possible design, the generating, by the security function entity, a security key between the core network element and the UE based on the key request and the first key includes:
  generating, by the security function entity, a security key between the MME and the UE based on the first key.

In a possible design, the generating, by the security function entity, a security key between the core network element and the UE based on the key request and the first key includes:
  generating, by the security function entity, a security key between the MM and the UE based on the first key and an identifier of the MM, where the identifier of the MM is sent by the MM to the security function entity by using the key request.

In a possible design, the generating a security key between the MM and the UE includes:
  generating, by the security function entity, a second key of the MM; and
  sending, by the security function entity, the second key of the MM to the MM, so that the MM generates the security key between the MM and the UE based on the second key of the MM.

In a possible design, the security function entity generates a security key between the SM and the UE based on the first key.

In a possible design, the generating, by the security function entity, a security key between the core network element and the UE based on the key request and the first key includes:
  generating, by the security function entity, the security key between the SM and the UE based on the first key and an identifier of the SM, where the identifier of the SM is sent by the SM to the security function entity by using the key request.

In a possible design, the receiving, by the security function entity, a key request sent by the core network element includes:
  receiving, by the security function entity, a key request sent by the SM, where the key request includes the first identification information, and the first identification information is sent by the UE to the SM.

In a possible design, the generating, by the security function entity, a security key between the core network element and the UE based on the key request and the first key includes:
  generating, by the security function entity, the security key between the SM and the UE based on the first key and the first identification information.

In a possible design, the generating, by the security function entity, a security key between the core network element and the UE based on the key request and the first key includes:
  generating, by the security function entity, the security key between the SM and the UE based on the first key, the first identification information, and an identifier of the SM, where the identifier of the SM is sent by the SM to the security function entity by using the key request.

In a possible design, the generating a security key between the SM and the UE includes:
  generating, by the security function entity, a second key of the SM; and
  sending, by the security function entity, the second key of the SM to the SM, so that the SM generates the security key between the SM and the UE based on the second key of the SM.

A second aspect of the present invention provides a security negotiation method, including:
  receiving, by a core network element, a request message sent by user equipment UE;
  determining, by the core network element according to a preset policy, whether security authentication needs to be performed on the UE; and
  performing, by the core network element, security negotiation based on a determining result, and obtaining a security key between the core network element and the UE.

In a possible design, the request message includes first identification information, where the first identification information is used to identify first security authentication between the UE and a security function entity.

In a possible design, the request message includes first identification information, where the first identification information is used to identify first security authentication between the UE and a security function entity, and includes address information of the security function entity corresponding to the first security authentication.

In a possible design, the core network element includes a mobility management MM entity, a session management SM entity, a non-access stratum NAS proxy node, a slice selection function SSF, or a core network node. The core network node supports an MM function and an SM function.

In a possible design, the performing, by the core network element, security negotiation based on a determining result, and obtaining a security key between the core network element and the UE includes:
  if the core network element determines that the security function entity corresponding to the first security authentication can be trusted:
  sending, by the core network element, a key request to the security function entity corresponding to the first security authentication, so that the security function entity corresponding to the first security authentication generates a second key of the core network element based on the key request; and
  generating, by the core network element, the security key between the core network element and the UE based on the second key of the core network element.

In a possible design, the performing, by the core network element, security negotiation based on a determining result, and obtaining a security key between the core network element and the UE includes:
  if the core network element determines that the security function entity corresponding to the first security authentication cannot be trusted:
  sending, by the core network element, an authentication request to a first security function entity, so that the first security function entity performs Authentication and Key Agreement with the UE based on the authentication request;
  sending, by the core network element, a key request to the first security function entity, so that the first security function entity generates a second key of the core network element based on the key request; and
  generating, by the core network element, the security key between the core network element and the UE based on the second key of the core network element.

A third aspect of the present invention provides a security negotiation method, including:
  sending, by user equipment UE, a first request message to a core network element, where the first message is used by the core network element to send an authentication request to a security function entity based on the first request message;
  performing, by the UE, Authentication and Key Agreement with the security function entity, and generating a security parameter, where the security parameter includes a first key; and
  generating, by the UE, a security key between the UE and the core network element based on the first key.

In a possible design, the method further includes:
  receiving, by the UE, first identification information sent by the security function entity, where the first identification information is generated by the security function entity when performing the Authentication and Key Agreement with the UE, and the first identification information is used to identify first security authentication between the UE and the security function entity.

In a possible design, the method further includes:
sending, by the UE, a second request message to the core network element, where the second request message includes the first identification information, so that the core network element sends a key request to the security function entity based on the first identification information.

In a possible design, the generating, by the UE, a security key between the UE and the core network element based on the first key includes:
generating, by the UE, a second key of the core network element based on the first key; and
generating, by the UE, a security key between the UE and the core network element based on the second key.

In a possible design, the generating, by the UE, a security key between the UE and the core network element based on the first key includes:
generating, by the UE, the second key of the core network element based on the first key and an identifier of the core network element; and
generating, by the UE, the security key between the UE and the core network element based on the second key.

In a possible design, the core network element includes a mobility management MM entity, a session management SM entity, a non-access stratum NAS proxy node, a slice selection function SSF, or a core network node. The core network node supports an MM function and an SM function.

A fourth aspect of the present invention provides a security function entity, including:
a receiving module, configured to receive an authentication request sent by a core network element, where the authentication request is generated by the core network element based on a request message of user equipment UE; and
a processing module, configured to: perform Authentication and Key Agreement with the UE based on the authentication request, and generate a security parameter, where the security parameter includes a first key, where
the receiving module is further configured to receive a key request sent by the core network element; and
the processing module is further configured to generate a security key between the core network element and the UE based on the key request and the first key.

In a possible design, the security parameter further includes first identification information, where the first identification information is used to identify first security authentication between the UE and the security function entity.

In a possible design, the security parameter further includes first identification information, where the first identification information is used to identify first security authentication between the UE and the security function entity, and the first identification information includes address information of the security function entity corresponding to the first security authentication.

In a possible design, the method further includes:
a sending module, configured to send the first identification information to the UE.

In a possible design, the core network element includes a mobility management MM entity, a session management SM entity, a non-access stratum NAS proxy node, a slice selection function SSF, or a core network node. The core network node supports an MM function and an SM function.

In a possible design, the processing module is configured to:
generate a security key between the MM and the UE based on the first key.

In a possible design, the processing module is further configured to:
generate the security key between the MM and the UE based on the first key and an identifier of the MM, where the identifier of the MM is sent by the MM to the security function entity by using the key request.

In a possible design, the processing module includes:
a first generation unit, configured to generate a second key of the MM; and
a first sending unit, configured to send the second key of the MM to the MM, so that the MM generates the security key between the MM and the UE based on the second key of the MM.

In a possible design, the processing module is further configured to:
generate a security key between the SM and the UE based on the first key.

In a possible design, the processing module is further configured to:
generate the security key between the SM and the UE based on the first key and an identifier of the SM, where the identifier of the SM is sent by the SM to the security function entity by using the key request.

In a possible design, the key request sent by the SM is received, where the key request includes the first identification information, and the first identification information is sent by the UE to the SM.

In a possible design, the security key between the SM and the UE is generated based on the first key and the first identification information.

In a possible design, the processing module is further configured to:
generate the security key between the SM and the UE based on the first key, the first identification information, and an identifier of the SM, where the identifier of the SM is sent by the SM to the security function entity by using the key request.

In a possible design, the processing module further includes:
a second generation unit, configured to generate a second key of the SM; and
a second sending unit, configured to send the second key of the SM to the SM, so that the SM generates the security key between the SM and the UE based on the second key of the SM.

A fifth aspect of the present invention provides a core network element, including:
a receiving module, configured to receive a request message sent by user equipment UE; and
a processing module, configured to determine, according to a preset policy, whether security authentication needs to be performed on the UE, where
the processing module is further configured to: perform security negotiation based on a determining result, and obtain a security key between the core network element and the UE.

In a possible design, the request message includes first identification information, where the first identification information is used to identify first security authentication between the UE and a security function entity.

In a possible design, the request message includes first identification information, where the first identification information is used to identify first security authentication between the UE and a security function entity, and includes address information of the security function entity corresponding to the first security authentication.

In a possible design, the core network element includes a mobility management MM entity, a session management SM entity, a non-access stratum NAS proxy node, a slice selection function SSF, or a core network node. The core network node supports an MM function and an SM function.

In a possible design, the processing module includes:
a first sending unit, configured to: when it is determined that the security function entity corresponding to the first security authentication can be trusted, send a key request to the security function entity corresponding to the first security authentication, so that the security function entity corresponding to the first security authentication generates a second key of the core network element based on the key request; and
a first generation unit, configured to generate the security key between the core network element and the UE based on the second key of the core network element.

In a possible design, the processing module further includes:
a second sending unit, configured to: when it is determined that the security function entity corresponding to the first security authentication cannot be trusted, send an authentication request to a first security function entity, so that the first security function entity performs Authentication and Key Agreement with the UE based on the authentication request;
a third sending unit, configured to send a key request to the first security function entity, so that the first security function entity generates a second key of the core network element based on the key request; and
a second generation unit, configured to generate the security key between the core network element and the UE based on the second key of the core network element.

A sixth aspect of the present invention provides user equipment, including:
a sending module, configured to send a first request message to a core network element, where the first message is used by the core network element to send an authentication request to a security function entity based on the first request message; and
a processing module, configured to: perform Authentication and Key Agreement with the security function entity, and generate a security parameter, where the security parameter includes a first key, where
the processing module is further configured to generate a security key between the UE and the core network element based on the first key.

In a possible design, the UE further includes:
a receiving module, configured to receive first identification information sent by the security function entity, where the first identification information is generated by the security function entity when performing the Authentication and Key Agreement with the UE, and the first identification information is used to identify first security authentication between the UE and the security function entity.

In a possible design, the sending module is further configured to:
send a second request message to the core network element, where the second request message includes the first identification information, so that the core network element sends a key request to the security function entity based on the first identification information.

In a possible design, the processing module includes:
a first generation unit, configured to generate a second key of the core network element based on the first key; and
a second generation unit, configured to generate the security key between the UE and the core network element based on the second key.

In a possible design, the processing module further includes:
a third generation unit, configured to generate the second key of the core network element based on the first key and an identifier of the core network element; and
a fourth generation unit, configured to generate the security key between the UE and the core network element based on the second key.

In a possible design, the core network element includes a mobility management MM entity, a session management SM entity, a non-access stratum NAS proxy node, a slice selection function SSF, or a core network node. The core network node supports an MM function and an SM function.

A seventh aspect of the present invention provides a security function entity, including:
a memory and a processor, where
the memory is configured to store a program instruction, and the processor is configured to call the program instruction in the memory, to perform the following method:
receiving an authentication request sent by a core network element, where the authentication request is generated by the core network element based on a request message of user equipment UE;
performing Authentication and Key Agreement with the UE based on the authentication request, and generating a security parameter, where the security parameter includes a first key;
receiving a key request sent by the core network element; and
generating a security key between the core network element and the UE based on the key request and the first key.

An eighth aspect of the present invention provides a core network element, including:
a memory and a processor, where
the memory is configured to store a program instruction, and the processor is configured to call the program instruction in the memory, to perform the following method:
receiving a request message sent by UE;
determining, according to a preset policy, whether security authentication needs to be performed on the UE; and
performing security negotiation based on a determining result, and obtaining a security key between the core network element and the UE.

A ninth aspect of the present invention provides user equipment, including:
a memory and a processor, where the memory is configured to store a program instruction, and the processor is configured to call the program instruction in the memory, to perform the following method:
sending a first request message to a core network element, where the first message is used by the core network element to send an authentication request to a security function entity based on the first request message;
performing Authentication and Key Agreement with the security function entity, and generating a security parameter, where the security parameter includes a first key; and generating a security key between the UE and the core network element based on the first key.

The solutions in embodiments of the present invention can negotiate NAS security for a 5G network architecture, thereby meeting a security requirement of a 5G network.

BRIEF DESCRIPTION OF DRAWINGS

To describe technical solutions in embodiments of the present invention more clearly, the following briefly describes the accompanying drawings. The accompanying drawings in the following description show some embodiments of the present invention, and persons of ordinary skill in the art may still derive other drawings from these accompanying drawings without creative efforts.

DESCRIPTION OF EMBODIMENTS

To make objectives, technical solutions, and advantages of embodiments of the present invention clearer, the following clearly describes technical solutions in embodiments of the present invention with reference to the accompanying drawings. The described embodiments are some but not all of the embodiments of the present invention. All other embodiments obtained by persons of ordinary skill in the art based on these exemplary embodiments of the present invention without creative efforts shall fall within the protection scope of the present invention.

It should be understood that the term "and/or" used in this specification may represent the following three cases: A, B, or both A and B. In addition, the character "I" in this specification may indicate an "or" relationship between the associated objects.

Figure 1:
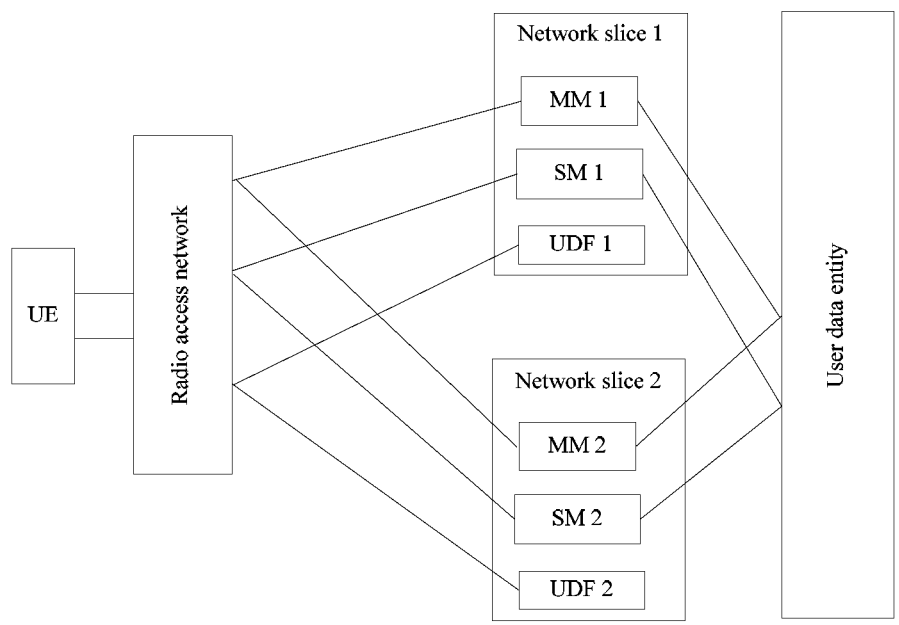
FIG. 1 is a diagram of a system architecture to which an embodiment of the present invention is applied.
Figure 2:
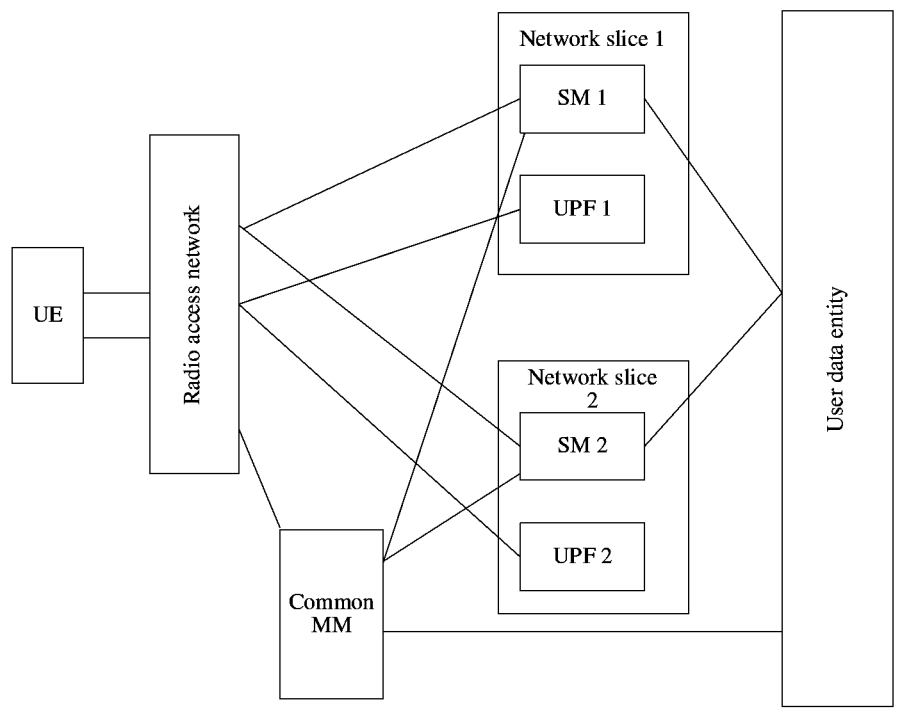
FIG. 2 is a diagram of another system architecture to which an embodiment of the present invention is applied.

FIG. 1 is a diagram of a system architecture to which an embodiment of the present invention is applied. FIG. 2 is a diagram of another system architecture to which an embodiment of the present invention is applied. As shown in FIG. 1, each network slice has an independent CPF entity and an independent UPF entity. A network slice 1 and a network slice 2 in FIG. 1 have respective MM function entities, SM function entities, and UPF function entities. As shown in FIG. 2, a plurality of network slices share only some CPF entities (such as an MM function entity), and each network slice has some independent CPF entities (such as an SM function entity) and an independent UPF entity. A network slice 1 and a network slice 2 in FIG. 2 share a common MM, and the network slice 1 and the network slice 2 have respective SM function entities and UPF function entities.

A method provided in embodiments of the present invention is applicable to either of the foregoing system architectures. In other words, for either system architecture, security negotiation between UE and a core network can be implemented by using the method provided in embodiments of the present invention.

A core network element described below in the present invention may be an MM, an SM, a NAS proxy node, a slice selection function (SSF), or a core network node. The core network node supports an MM function and an SM function.

A security function entity described in the present invention is specially configured to implement a security function, and is also a network element in a core network.

Figure 3:
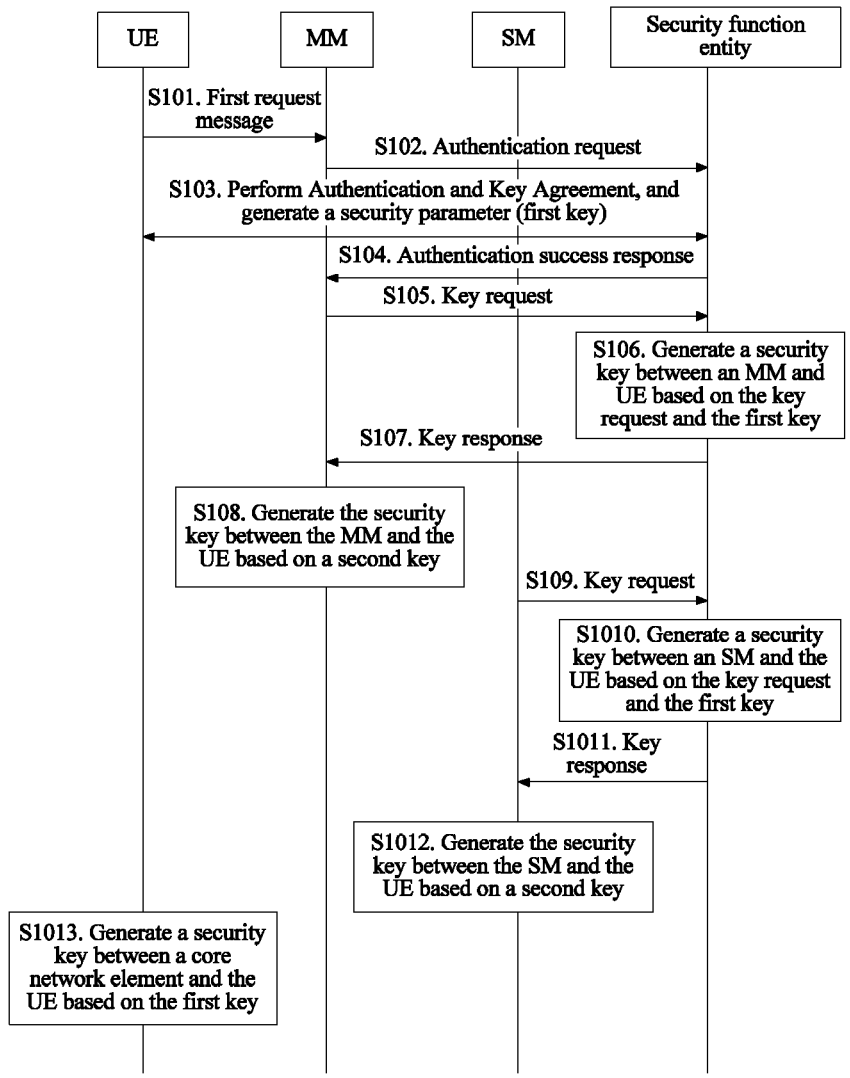
FIG. 3 is an interactive flowchart of Embodiment 1 of a security negotiation method according to embodiments of the present invention.

FIG. 3 is an interactive flowchart of Embodiment 1 of a security negotiation method according to embodiments of the present invention. As shown in FIG. 3, the method includes the following steps.

S101. UE sends a first request message to a core network element.

It should be noted that in this embodiment, an MM and an SM are used as an example to describe security negotiation. The MM and the SM in this embodiment may alternatively be replaced with other core network elements described above.

The message may be first sent to an SSF, and then sent to a security function entity. The message may alternatively be directly sent to the security function entity, without being processed by any intermediate core network function entity or without passing through any intermediate core network function entity.

For example, the first request message may be an attach request message, or the message may be another NAS message between the UE and the core network element, such as an MM message, an SM message, or an authentication message.

S102. The core network element sends an authentication request to a security function entity.

The authentication request may be the first request message, or may be a new message generated after the first request message is processed. The core network element may directly and transparently transmit the first request message to the security function entity, or may process the first request message, then generate an authentication request, and send the authentication request to the security function entity.

S103. The security function entity performs Authentication and Key Agreement with the UE based on the authentication request, and generates a security parameter, where the security parameter includes a first key.

The security function entity may be merged into the MM, and interaction between the MM and the security function entity is internal interaction. The security function entity may alternatively be merged into the SM, and interaction between the SM and the security function entity is internal interaction.

Optionally, the security function entity includes two parts, namely, an authentication module and a key management module. The two modules may be independent of each other. The authentication module is an independent entity, and the key management module may be merged into a user data entity.

S104. The security function entity sends an authentication success response to the core network element.

S105. An MM sends a key request to the security function entity.

S106. The security function entity generates a security key between the MM and the UE based on the key request and the first key.

The security function entity generates a second key of the MM based on the key request and the first key.

S107. The security function entity sends a key response to the MM, where the key response includes a second key of the MM.

S108. The MM generates the security key between the MM and the UE based on the second key of the MM.

S109. An SM sends a key request to the security function entity.

S1010. The security function entity generates a security key between the SM and the UE based on the key request and the first key.

The security function entity generates a second key of the SM based on the key request and the first key.

S1011. The security function entity sends a key response to the SM, where the key response includes a second key of the SM.

S1012. The SM generates the security key between the SM and the UE based on the second key of the SM.

S1013. The UE generates a security key between the core network element and the UE based on the first key.

In this step, the UE generates security keys between the UE and different core network elements for the core network elements respectively.

For example, when the MM generates the security key between the MM and the UE, the UE generates the second key of the MM based on the first key, and generates the security key between the UE and the MM based on the second key of the MM.

When the SM generates the security key between the SM and the UE, the UE generates the second key of the SM based on the first key, and generates the security key between the UE and the SM based on the second key of the SM.

In this embodiment, NAS security for a 5G network architecture can be negotiated, thereby meeting a security requirement of a 5G network.

Figure 4:
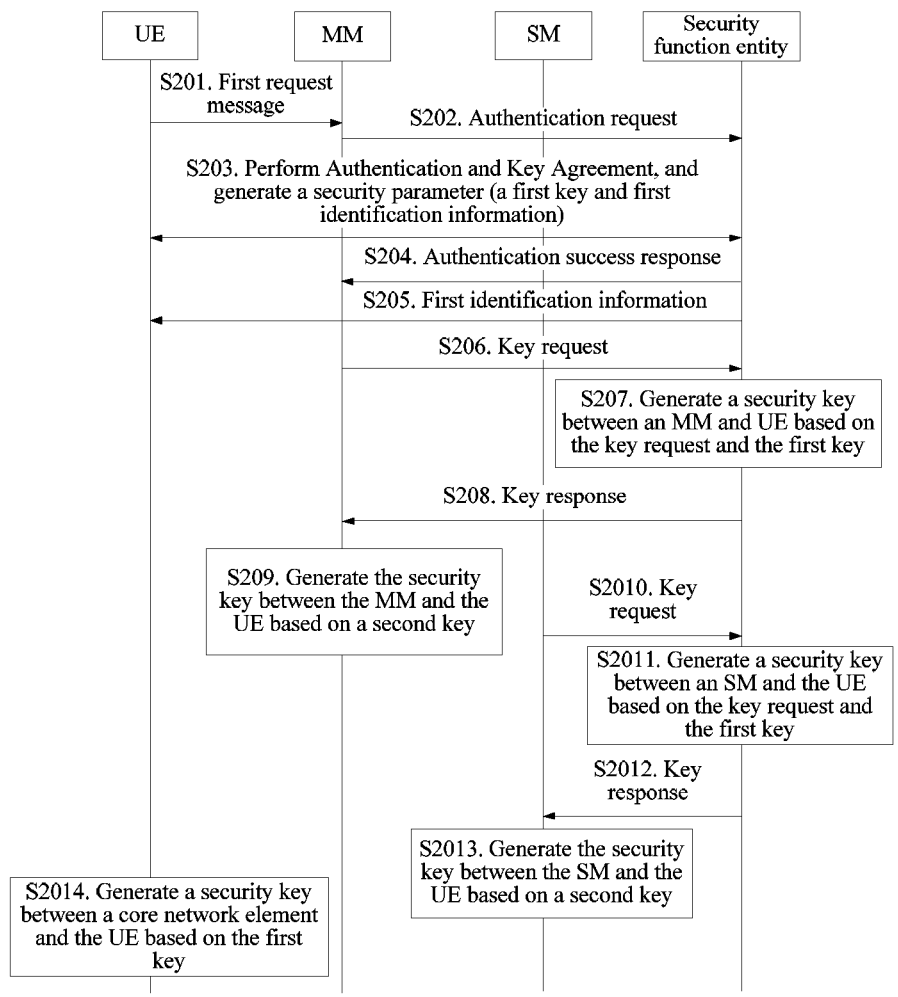
FIG. 4 is an interactive flowchart of Embodiment 2 of a security negotiation method according to embodiments of the present invention.

FIG. 4 is an interactive flowchart of Embodiment 2 of a security negotiation method according to embodiments of the present invention. As shown in FIG. 4, the method includes the following steps.

S201. UE sends a first request message to a core network element.

S202. The core network element sends an authentication request to a security function entity.

S203. The security function entity performs Authentication and Key Agreement with the UE based on the authentication request, and generates a security parameter, where the security parameter includes a first key and first identification information.

In an optional implementation, the first identification information is used to identify first security authentication between the UE and the security function entity.

In another optional implementation, the first identification information is used to identify first security authentication between the UE and the security function entity, and includes address information of the security function entity corresponding to the first security authentication.

S204. The security function entity sends an authentication success response to the core network element.

S205. The security function entity sends the first identification information to the UE.

The security function entity sends the first identification information to the UE. When the UE re-sends a request message and needs to perform security negotiation, the security function entity may reuse a previous negotiation result, without needing to perform negotiation processing again.

It should be noted that the security function entity may send the first identification information to the UE at any stage after the first identification information is generated. In other words, there is no strict sequential order between this step and steps before and after this step. For example, the security function entity may directly generate the first identification information and send the first identification information to the UE in a process of performing authentication and security negotiation with the UE. Alternatively, the security function entity may send the first identification information by using another message after generating the first identification information. In other words, this step is an optional step, and the first identification information may be sent in this step or during negotiation in S203.

S206. An MM sends a key request to the security function entity.

S207. The security function entity generates a security key between the MM and the UE based on the key request and the first key.

The security function entity generates a second key of the MM based on the key request and the first key.

S208. The security function entity sends a key response to the MM, where the key response includes a second key of the MM.

S209. The MM generates the security key between the MM and the UE based on the second key of the MM.

S2010. An SM sends a key request to the security function entity.

S2011. The security function entity generates a security key between the SM and the UE based on the key request and the first key.

The security function entity generates a second key of the SM based on the key request and the first key.

S2012. The security function entity sends a key response to the SM, where the key response includes a second key of the SM.

S2013. The SM generates the security key between the SM and the UE based on the second key of the SM.

S2014. The UE generates a security key between the core network element and the UE based on the first key.

In this step, the UE generates security keys between the UE and different core network elements for the core network elements respectively.

In addition, the UE may generate the security keys of the core network elements at different times. Preferably, when the MM generates the security key between the MM and the UE, the UE also correspondingly generates the security key between the MM and the UE. When the SM generates the security key between the SM and the UE, the UE also correspondingly generates the security key between the SM and the UE.

In the foregoing embodiment, the security function entity may generate the security key between the MM and the UE based on the key request and the first key in the following two optional manners.

In a first optional manner, the security function entity generates the security key between the MM and the UE based on the first key.

The security function entity generates the second key of the MM based on the first key.

The first key is a base key, and the second key of the MM is a key obtained through calculation by using an algorithm based on the first key.

Further, after receiving the second key of the MM, the MM generates the security key between the MM and the UE based on the second key of the MM. The security key between the MM and the UE may include an integrity protection key and an encryption key. In other words, the integrity protection key and the encryption key between the MM and the UE can be calculated by using the second key of the MM.

An example of an algorithm of the integrity protection key of the MM is:

NAS_int_MM=HMAC-SHA256(Kasme_MM, integrity key label, Alg_int ID)

where Kasme_MM is the second key of the MM, the integrity key label indicates that the algorithm is used to calculate the integrity protection key, and Alg_int ID is an integrity protection algorithm identifier.

For example, an example of an algorithm of the encryption key of the MM is:

NAS_enc_MM=HMAC-SHA256(Kasme_MM, confidentiality key label, Alg_enc ID)

where Kasme_MM is the second key of the MM, the confidentiality key label indicates that the algorithm is used to calculate the encryption key, and Alg_enc ID is an encryption algorithm identifier.

In a second optional manner, the security function entity generates the security key between the MM and the UE based on the first key and an identifier of the MM, where the identifier of the MM is sent by the MM to the security function entity by using the key request.

The security function entity generates the second key of the MM based on the first key and the identifier of the MM.

The first key is a base key, and the second key of the MM is a key obtained through calculation with reference to the identifier of the MM by using an algorithm based on the first key. For example, the second key of the MM may be calculated by using the following algorithm:

Kasme_MM=HMAC-SHA256(Kasme, MM ID)

where Kasme is the first key, and the MM ID is the identifier of the MM.

Further, after receiving the second key of the MM, the MM generates the security key between the MM and the UE based on the second key of the MM. The security key between the MM and the UE may include an integrity protection key and an encryption key. In other words, the integrity protection key and the encryption key between the MM and the UE can be calculated by using the second key of the MM.

For example, an example of an algorithm of the integrity protection key of the MM is:

NAS_int_MM=HMAC-SHA256(Kasme_MM, integrity key label, Alg_int ID)

where Kasme_MM is the second key of the MM, the integrity key label indicates that the algorithm is used to calculate the integrity protection key, and Alg_int ID is an integrity protection algorithm identifier.

An example of an algorithm of the encryption key of the MM is:

NAS_enc_MM=HMAC-SHA256(Kasme_MM, confidentiality key label, Alg_enc ID)

where Kasme_MM is the second key of the MM, the confidentiality key label indicates that the algorithm is used to calculate the encryption key, and Alg_enc ID is an encryption algorithm identifier.

In the foregoing embodiment, the security function entity may generate the security key between the SM and the UE based on the key request and the first key in the following two optional manners.

In a first optional manner, the security function entity generates the security key between the SM and the UE based on the first key.

The security function entity generates the second key of the SM based on the first key.

The first key is a base key, and the second key of the SM is a key obtained through calculation by using an algorithm based on the first key.

Further, after receiving the second key of the SM, the SM generates the security key between the SM and the UE based on the second key of the SM. The security key between the SM and the UE may include an integrity protection key and an encryption key. In other words, the integrity protection key and the encryption key between the SM and the UE can be calculated by using the second key of the SM.

In a second optional manner, the security function entity generates the security key between the SM and the UE based on the first key and an identifier of the SM, where the identifier of the SM is sent by the SM to the security function entity by using the key request.

The security function entity generates the second key of the SM based on the first key and the identifier of the SM.

The first key is a base key, and the second key of the SM is a key obtained through calculation with reference to the identifier of the SM by using an algorithm based on the first key.

Further, after receiving the second key of the SM, the SM generates the security key between the SM and the UE based on the second key of the SM. The security key between the SM and the UE may include an integrity protection key and an encryption key. In other words, the integrity protection key and the encryption key between the SM and the UE can be calculated by using the second key of the SM.

Figure 5:
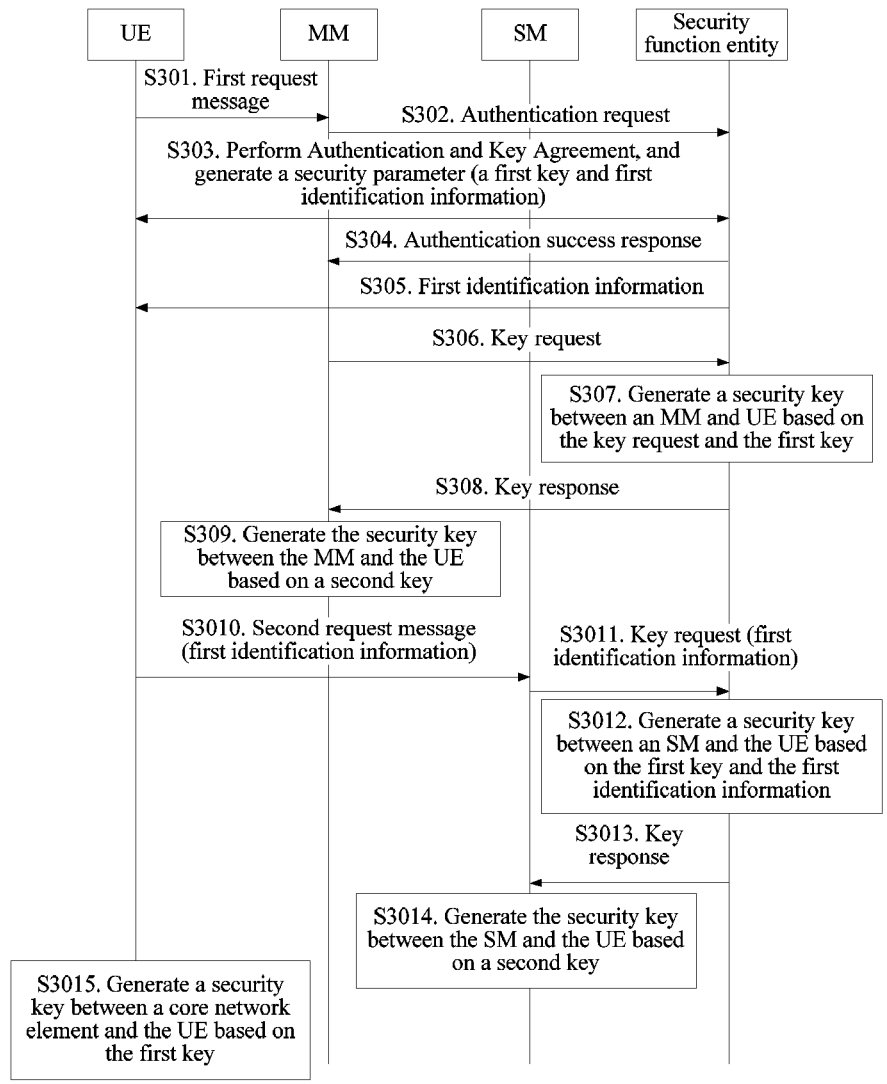
FIG. 5 is an interactive flowchart of Embodiment 3 of a security negotiation method according to embodiments of the present invention.

FIG. 5 is an interactive flowchart of Embodiment 3 of a security negotiation method according to embodiments of the present invention. As shown in FIG. 5, the method includes the following steps.

S301. UE sends a first request message to a core network element.

S302. The core network element sends an authentication request to a security function entity.

S303. The security function entity performs Authentication and Key Agreement with the UE based on the authentication request, and generates a security parameter, where the security parameter includes a first key and first identification information.

In an optional implementation, the first identification information is used to identify first security authentication between the UE and the security function entity.

In another optional implementation, the first identification information is used to identify first security authentication between the UE and the security function entity, and includes address information of the security function entity corresponding to the first security authentication.

S304. The security function entity sends an authentication success response to the core network element.

S305. The security function entity sends the first identification information to the UE.

The security function entity sends the first identification information to the UE. When the UE re-sends a request message and needs to perform security negotiation, the security function entity may reuse a previous negotiation result, without needing to perform negotiation processing again.

It should be noted that the security function entity may send the first identification information to the UE at any stage after the first identification information is generated. In other words, there is no strict sequential order between this step and steps before and after this step. For example, the security function entity may directly generate the first identification information and send the first identification information to the UE in a process of performing authentication and security negotiation with the UE. Alternatively, the security function entity may send the first identification information by using another message after generating the first identification information.

In other words, this step is an optional step, and the first identification information may be sent in this step or during negotiation in S303.

S306. An MM sends a key request to the security function entity.

S307. The security function entity generates a security key between the MM and the UE based on the key request and the first key.

The security function entity generates a second key of the MM based on the key request and the first key.

S308. The security function entity sends a key response to the MM, where the key response includes a second key of the MM.

S309. The MM generates the security key between the MM and the UE based on the second key of the MM.

S3010. The UE sends a second request message to an SM, where the second request message includes the first identification information.

The UE may add the first identification information to a connection establishment request message when sending the connection establishment request message.

S3011. The SM sends a key request to the security function entity, where the key request includes the first identification information.

S3012. The security function entity generates a security key between the SM and the UE based on the first key and the first identification information.

The security function entity determines, based on the first identification information, whether the SM has been successfully authenticated previously, and if yes, determines a first key, and determines the second key of the SM based on the first key.

As described above, the first identification information is used to identify the first security authentication between the UE and the security function entity. After the security function entity completes security and authentication negotiation with the UE, and obtains the first identification information, the security function entity sends the first identification information to the UE. When the UE re-initiates a message such as a connection establishment request message, the UE may add the first identification information to the message. The security function entity may rapidly generate the second key of the SM based on the first identification information and based on a previous authentication and negotiation result, thereby greatly improving processing efficiency.

S3013. The security function entity sends a key response to the SM, where the key response includes a second key of the SM.

S3014. The SM generates the security key between the SM and the UE based on the second key of the SM.

S3015. The UE generates a security key between the core network element and the UE based on the first key.

In this step, the UE generates security keys between the UE and different core network elements for the core network elements respectively.

In addition, the UE may generate the security keys of the core network elements at different times. Preferably, when the MM generates the security key between the MM and the UE, the UE also correspondingly generates the security key between the MM and the UE. When the SM generates the security key between the SM and the UE, the UE also correspondingly generates the security key between the SM and the UE.

In another embodiment, during generation of the security key between the SM and the UE in step S3012, the security key between the SM and the UE may alternatively be generated based on the first key, the first identification information, and the identifier of the SM. The identifier of the SM is sent by the SM to the security function entity by using the key request.

The security function entity generates the second key of the SM based on the first key, the first identification information, and an identifier of the SM.

Figure 6:
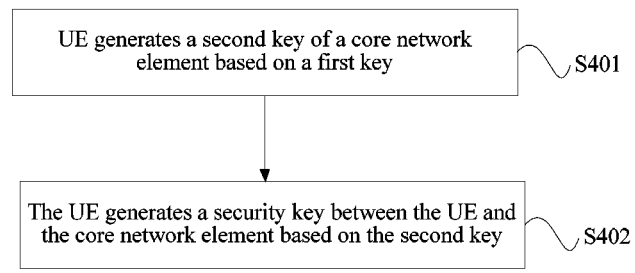
FIG. 6 is a schematic flowchart of generating a security key by UE in Embodiment 4 of a security negotiation method according to embodiments of the present invention.

FIG. 6 is a schematic flowchart of generating a security key by UE in Embodiment 4 of a security negotiation method according to embodiments of the present invention. As shown in FIG. 6, in step S1013, S2014, and S3015, the process in which the UE generates the security key between the UE and the core network element is:

S401. The UE generates a second key of the core network element based on the first key.

S402. The UE generates the security key between the UE and the core network element based on the second key.

Figure 7:
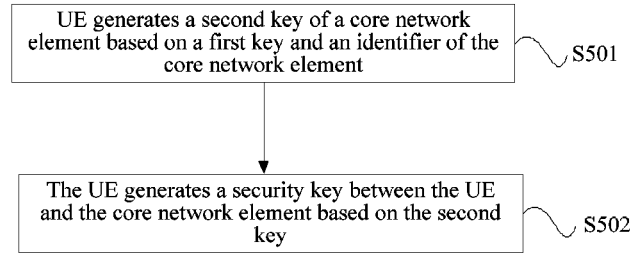
FIG. 7 is a schematic flowchart of generating a security key by UE in Embodiment 5 of a security negotiation method according to embodiments of the present invention.

FIG. 7 is a schematic flowchart of generating a security key by UE in Embodiment 5 of a security negotiation method according to embodiments of the present invention. As shown in FIG. 7, in step S1013, S2014, and S3015, another process in which the UE generates the security key between the UE and the core network element is:

S501. The UE generates the second key of the core network element based on the first key and an identifier of the core network element.

In other words, the UE generates the second key of the core network element based on both the first key and the identifier of the core network element.

For example, the UE may generate the second key of the MM based on the first key and an identifier of the MM.

S502. The UE generates the security key between the UE and the core network element based on the second key.

Figure 8:
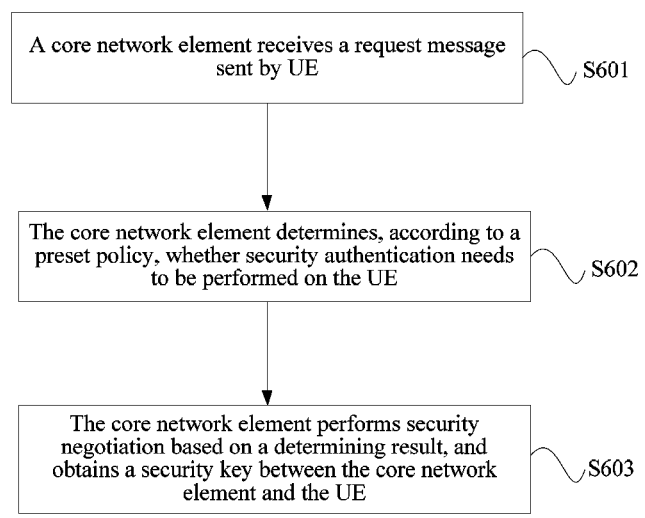
FIG. 8 is a schematic flowchart of Embodiment 1 of another security negotiation method according to embodiments of the present invention.

FIG. 8 is a schematic flowchart of Embodiment 1 of another security negotiation method according to embodiments of the present invention. The method is performed by a core network element. The method includes the following steps.

S601. The core network element receives a request message sent by UE.

The request message may be, for example, a connection establishment request.

S602. The core network element determines, according to a preset policy, whether security authentication needs to be performed on the UE.

A plurality of policies may be configured on the core network element, and may be used to specify information such as reliability of the core network element connected to the UE.

S603. The core network element performs security negotiation based on a determining result, and obtains a security key between the core network element and the UE.

In this embodiment, after receiving the request message of the UE, the core network element first determines whether security authentication needs to be performed on the UE. This can ensure that the UE is connected to a security function entity that can be trusted.

In an optional solution, the request message includes first identification information, where the first identification information is used to identify first security authentication between the UE and a security function entity.

In an optional solution, the request message includes first identification information, where the first identification information is used to identify first security authentication between the UE and a security function entity, and includes address information of the security function entity corresponding to the first security authentication.

Figure 9:
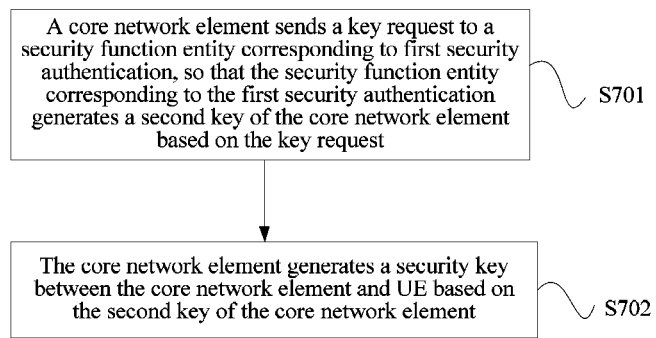
FIG. 9 is a schematic flowchart of Embodiment 2 of another security negotiation method according to embodiments of the present invention.

FIG. 9 is a schematic flowchart of Embodiment 2 of another security negotiation method according to embodiments of the present invention. As shown in FIG. 9, in step S603, when the core network element determines that the security function entity corresponding to the first security authentication can be trusted, the following processing is performed:

S701. The core network element sends a key request to the security function entity corresponding to the first security authentication, so that the security function entity corresponding to the first security authentication generates a second key of the core network element based on the key request.

S702. The core network element generates the security key between the core network element and the UE based on the second key of the core network element.

When the security function entity corresponding to the first identification information can be trusted, the security function entity corresponding to the first identification information may be directly used to generate the security key between the UE and the core network element.

Figure 10:
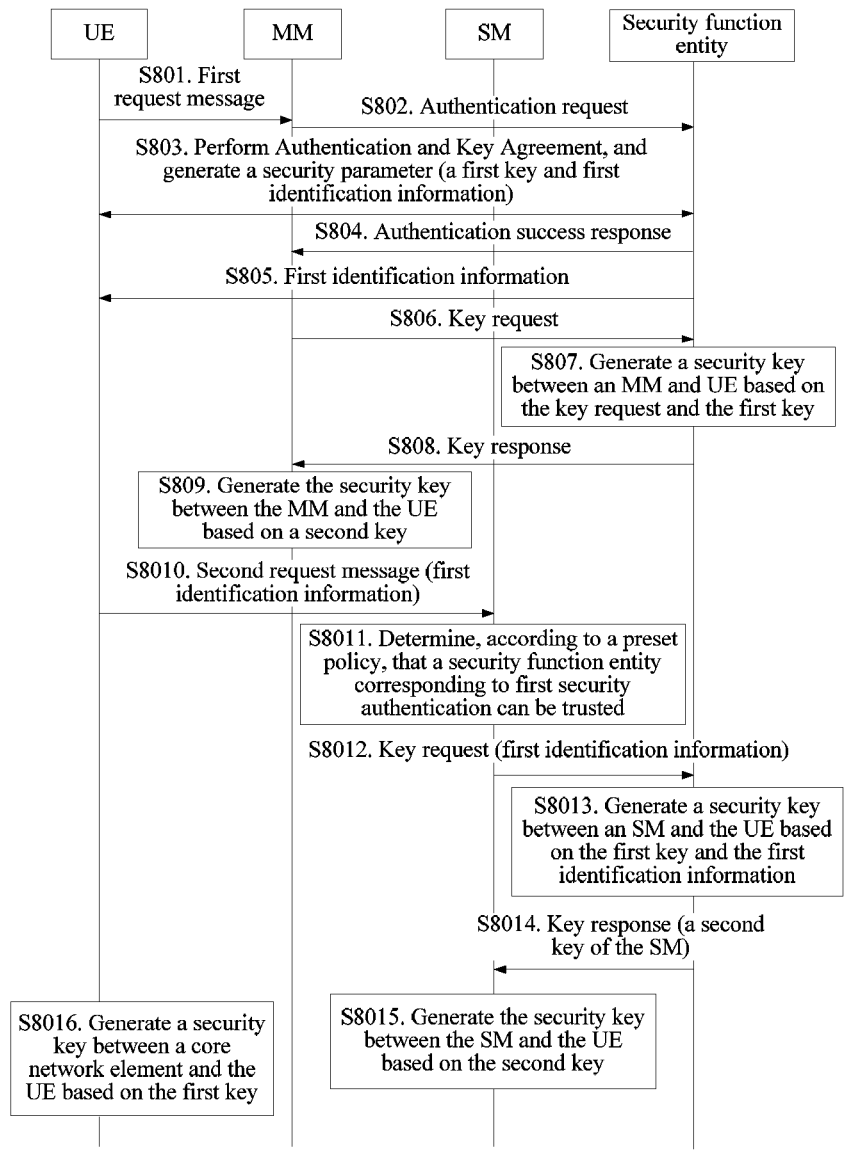
FIG. 10 is an interactive flowchart when a security function entity can be trusted in Embodiment 2 of another security negotiation method according to embodiments of the present invention.

FIG. 10 is an interactive flowchart when a security function entity can be trusted in Embodiment 2 of another security negotiation method according to embodiments of the present invention. As shown in FIG. 10, the method includes the following steps.

S801. UE sends a first request message to a core network element.

S802. The core network element sends an authentication request to a security function entity.

S803. The security function entity performs Authentication and Key Agreement with the UE based on the authentication request, and generates a security parameter, where the security parameter includes a first key and first identification information.

S804. The security function entity sends an authentication success response to the core network element.

S805. The security function entity sends the first identification information to the UE.

It should be noted that the security function entity may send the first identification information to the UE at any stage after the first identification information is generated. In other words, there is no strict sequential order between this step and steps before and after this step. For example, the security function entity may directly generate the first identification information and send the first identification information to the UE in a process of performing authentication and security negotiation with the UE. Alternatively, the security function entity may send the first identification information by using another message after generating the first identification information.

In other words, this step is an optional step, and the first identification information may be sent in this step or during negotiation in S803.

S806. An MM sends a key request to the security function entity.

S807. The security function entity generates a security key between the MM and the UE based on the key request and the first key.

The security function entity generates a second key of the MM based on the key request and the first key.

S808. The security function entity sends a key response to the MM, where the key response includes a second key of the MM.

S809. The MM generates the security key between the MM and the UE based on the second key of the MM.

S8010. The UE sends a second request message to an SM, where the second request message includes the first identification information.

The UE may add the first identification information to a connection establishment request message when sending the connection establishment request message.

S8011. The SM determines, according to a preset policy, that the security function entity corresponding to first security authentication can be trusted.

S8012. The SM sends a key request to the security function entity corresponding to the first security authentication, where the key request includes the first identification information.

S8013. The security function entity generates a security key between the SM and the UE based on the first key and the first identification information.

The security function entity determines, based on the first identification information, whether the SM has been successfully authenticated previously, and if yes, determines a first key, and determines the second key of the SM based on the first key.

S8014. The security function entity sends a key response to the SM, where the key response includes a second key of the SM.

S8015. The SM generates the security key between the SM and the UE based on the second key of the SM.

S8016. The UE generates a security key between the core network element and the UE based on the first key.

Figure 11:
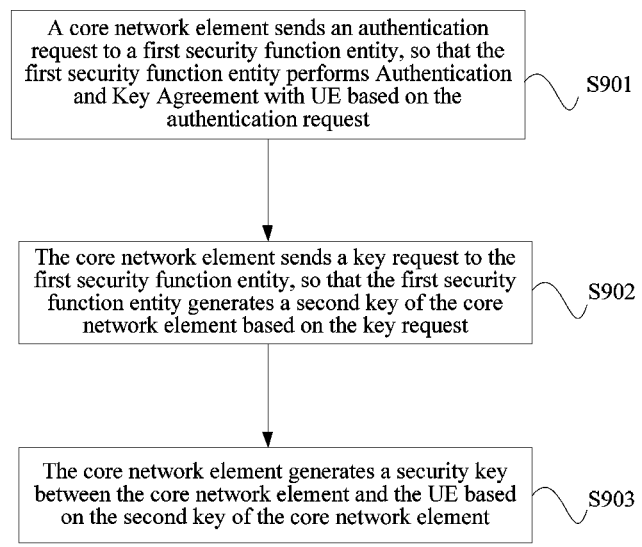
FIG. 11 is a schematic flowchart of Embodiment 3 of another security negotiation method according to embodiments of the present invention.

FIG. 11 is a schematic flowchart of Embodiment 3 of another security negotiation method according to embodiments of the present invention. As shown in FIG. 11, in step S603, when the core network element determines that the security function entity corresponding to the first security authentication cannot be trusted, the following processing is performed:

S901. The core network element sends an authentication request to a first security function entity, so that the first security function entity performs Authentication and Key Agreement with the UE based on the authentication request.

The first security function entity is a security function entity that the core network element considers trusted.

S902. The core network element sends a key request to the first security function entity, so that the first security function entity generates a second key of the core network element based on the key request.

S903. The core network element generates the security key between the core network element and the UE based on the second key of the core network element.

Figure 12:
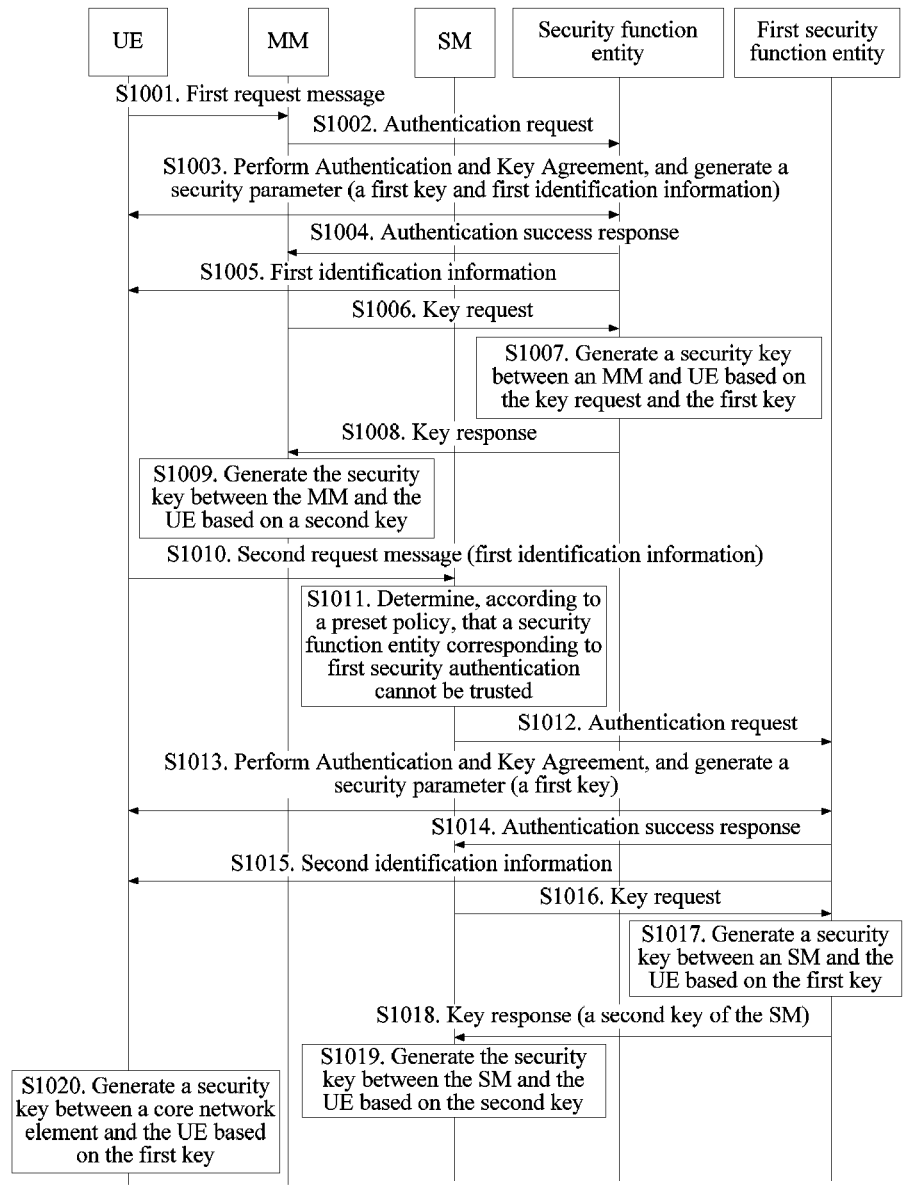
FIG. 12 is an interactive flowchart when a security function entity cannot be trusted in Embodiment 3 of another security negotiation method according to embodiments of the present invention.

FIG. 12 is an interactive flowchart when a security function entity cannot be trusted in Embodiment 3 of another security negotiation method according to embodiments of the present invention. As shown in FIG. 12, the method includes the following steps.

S1001. UE sends a first request message to a core network element.

S1002. The core network element sends an authentication request to a security function entity.

S1003. The security function entity performs Authentication and Key Agreement with the UE based on the authentication request, and generates a security parameter, where the security parameter includes a first key and first identification information.

S1004. The security function entity sends an authentication success response to the core network element.

S1005. The security function entity sends the first identification information to the UE.

It should be noted that the security function entity may send the first identification information to the UE at any stage after the first identification information is generated. In other words, there is no strict sequential order between this step and steps before and after this step. For example, the security function entity may directly generate the first identification information and send the first identification information to the UE in a process of performing authentication and security negotiation with the UE. Alternatively, the security function entity may send the first identification information by using another message after generating the first identification information.

In other words, this step is an optional step, and the first identification information may be sent in this step or during negotiation in S1003.

S1006. An MM sends a key request to the security function entity.

S1007. The security function entity generates a security key between the MM and the UE based on the key request and the first key.

The security function entity generates a second key of the MM based on the key request and the first key.

S1008. The security function entity sends a key response to the MM, where the key response includes a second key of the MM.

S1009. The MM generates the security key between the MM and the UE based on the second key of the MM.

S1010. The UE sends a second request message to an SM, where the second request message includes the first identification information.

The UE may add the first identification information to a connection establishment request message when sending the connection establishment request message.

S1011. The SM determines, according to a preset policy, that the security function entity corresponding to first security authentication cannot be trusted.

S1012. The SM sends an authentication request to a first security function entity.

The first security function entity is a security function entity that the SM considers trusted based on the preset policy.

S1013. The first security function entity performs Authentication and Key Agreement with the UE based on the authentication request, and generates a security parameter, where the security parameter includes a first key and second identification information.

The second identification information is used to identify security authentication between the UE and the first security function entity.

S1014. The first security function entity sends an authentication success response to the SM.

S1015. The first security function entity sends the second identification information to the UE.

It should be noted that the first security function entity may send the second identification information to the UE at any stage after the second identification information is generated. In other words, there is no strict sequential order between this step and steps before and after this step. For example, the first security function entity may directly generate the second identification information and send the first identification information to the UE in a process of performing authentication and security negotiation with the UE. Alternatively, the security function entity may send the second identification information by using another message after generating the first identification information.

In other words, this step is an optional step, and the second identification information may be sent in this step or during negotiation in S1013.

S1016. The SM sends a key request to the first security function entity.

S1017. The first security function entity generates a security key between the SM and the UE based on the key request and the first key.

The security function entity generates a second key of the MM based on the key request and the first key.

S1018. The first security function entity sends a key response to the SM, where the key response includes a second key of the SM.

S1019. The SM generates the security key between the SM and the UE based on the second key of the SM.

S1020. The UE generates a security key between the core network element and the UE based on the first key.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Figure 13:
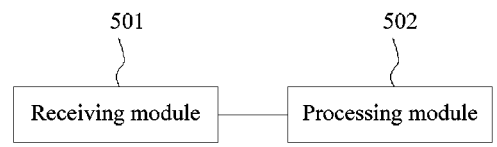
FIG. 13 is a module structure diagram in Embodiment 1 of a security function entity according to embodiments of the present invention.

FIG. 13 is a module structure diagram in Embodiment 1 of a security function entity according to embodiments of the present invention. As shown in FIG. 13, the security function entity includes:

a receiving module 501, configured to receive an authentication request sent by a core network element, where the authentication request is generated by the core network element based on a request message of UE; and a processing module 502, configured to: perform Authentication and Key Agreement with the UE based on the authentication request, and generate a security parameter, where the security parameter includes a first key.

The receiving module 501 is further configured to receive a key request sent by the core network element.

The processing module 502 is further configured to generate a security key between the core network element and the UE based on the key request and the first key.

The security function entity is configured to implement the foregoing method embodiment, and their implementation principles and technical effects are similar. Details are not described herein again.

In another embodiment, the security parameter further includes first identification information, where the first identification information is used to identify first security authentication between the UE and the security function entity.

In another embodiment, the security parameter further includes first identification information, where the first identification information is used to identify first security authentication between the UE and the security function entity, and the first identification information includes address information of the security function entity corresponding to the first security authentication.

Figure 14:
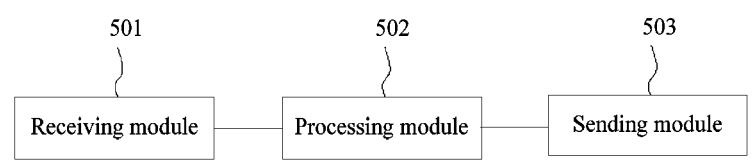
FIG. 14 is a module structure diagram in Embodiment 2 of a security function entity according to embodiments of the present invention.

FIG. 14 is a module structure diagram in Embodiment 2 of a security function entity according to embodiments of the present invention. As shown in FIG. 14, the security function entity further includes:

a sending module 503, configured to send the first identification information to the UE.

In another embodiment, the processing module 502 is configured to:

generate a security key between an MM and the UE based on the first key.

In another embodiment, the processing module 502 is further configured to:

generate the security key between the MM and the UE based on the first key and an identifier of the MM, where the identifier of the MM is sent by the MM to the security function entity by using the key request.

Figure 15:
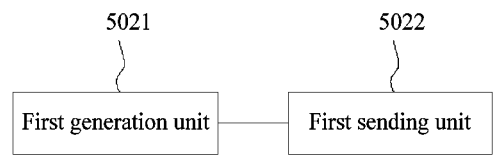
FIG. 15 is a module structure diagram in Embodiment 3 of a security function entity according to embodiments of the present invention.

FIG. 15 is a module structure diagram in Embodiment 3 of a security function entity according to embodiments of the present invention. As shown in FIG. 15, the processing module 502 includes:

a first generation unit 5021, configured to generate a second key of the MM; and a first sending unit 5022, configured to send the second key of the MM to the MM, so that the MM generates the security key between the MM and the UE based on the second key of the MM.

In another embodiment, the processing module 502 is further configured to:

generate a security key between an SM and the UE based on the first key.

In another embodiment, the processing module 502 is further configured to:

generate the security key between the SM and the UE based on the first key and an identifier of the SM, where the identifier of the SM is sent by the SM to the security function entity by using the key request.

In another embodiment, the receiving module 501 is configured to:

receive a key request sent by the SM, where the key request includes first identification information, and the first identification information is sent by the UE to the SM.

In another embodiment, the processing module 502 is further configured to:

generate the security key between the SM and the UE based on the first key and the first identification information.

In another embodiment, the processing module 502 is further configured to:

generate the security key between the SM and the UE based on the first key, the first identification information, and an identifier of the SM, where the identifier of the SM is sent by the SM to the security function entity by using the key request.

Figure 16:
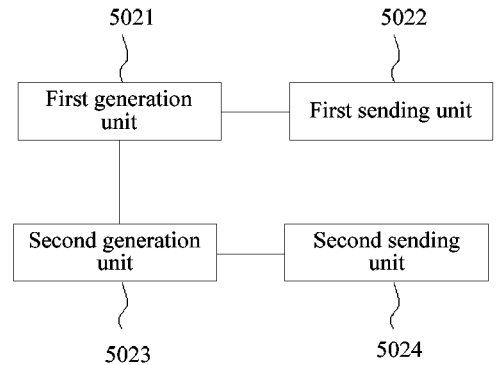
FIG. 16 is a module structure diagram in Embodiment 4 of a security function entity according to embodiments of the present invention.

FIG. 16 is a module structure diagram in Embodiment 4 of a security function entity according to embodiments of the present invention. As shown in FIG. 16, the processing module 502 further includes:

a second generation unit 5023, configured to generate a second key of the SM; and a second sending unit 5024, configured to send the second key of the SM to the SM, so that the SM generates the security key between the SM and the UE based on the second key of the SM.

Figure 17:
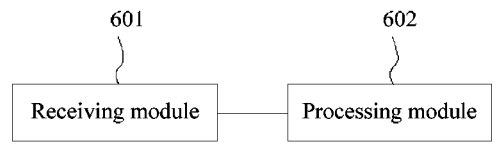
FIG. 17 is a module structure diagram in Embodiment 1 of a core network element according to embodiments of the present invention.

FIG. 17 is a module structure diagram in Embodiment 1 of a core network element according to embodiments of the present invention. As shown in FIG. 17, the core network element includes:

a receiving module 601, configured to receive a request message sent by UE; and a processing module 602, configured to determine, according to a preset policy, whether security authentication needs to be performed on the UE.

The processing module 602 is further configured to: perform security negotiation based on a determining result, and obtain a security key between the core network element and the UE.

In another embodiment, the request message includes first identification information, where the first identification information is used to identify first security authentication between the UE and a security function entity.

In another embodiment, the request message includes first identification information, where the first identification information is used to identify first security authentication between the UE and a security function entity, and includes address information of the security function entity corresponding to the first security authentication.

Figure 18:
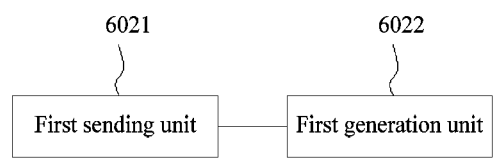
FIG. 18 is a module structure diagram in Embodiment 2 of a core network element according to embodiments of the present invention.

FIG. 18 is a module structure diagram in Embodiment 2 of a core network element according to embodiments of the present invention. As shown in FIG. 18, the processing module 602 includes:

a first sending unit 6021, configured to: when it is determined that the security function entity corresponding to the first security authentication can be trusted, send a key request to the security function entity corresponding to the first security authentication, so that the security function entity corresponding to the first security authentication generates a second key of the core network element based on the key request; and a first generation unit 6022, configured to generate the security key between the core network element and the UE based on the second key of the core network element.

Figure 19:
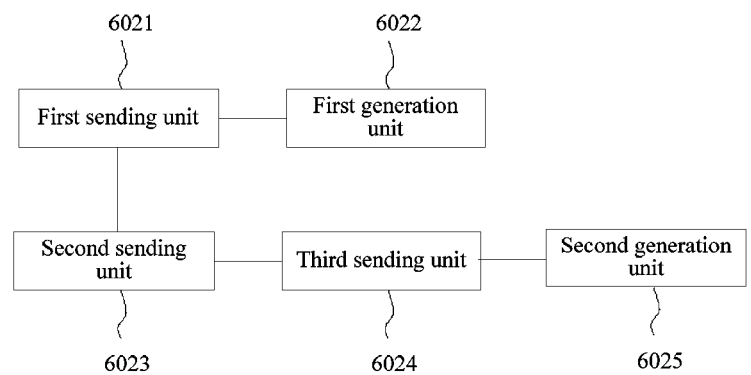
FIG. 19 is a module structure diagram in Embodiment 3 of a core network element according to embodiments of the present invention.

FIG. 19 is a module structure diagram in Embodiment 3 of a core network element according to embodiments of the present invention. As shown in FIG. 19, the processing module 602 further includes:

a second sending unit 6023, configured to: when it is determined that the security function entity corresponding to the first security authentication cannot be trusted, send an authentication request to a first security function entity, so that the first security function entity performs Authentication and Key Agreement with the UE based on the authentication request;

a third sending unit 6024, configured to send a key request to the first security function entity, so that the first security function entity generates a second key of the core network element based on the key request; and a second generation unit 6025, configured to generate the security key between the core network element and the UE based on the second key of the core network element.

Figure 20:
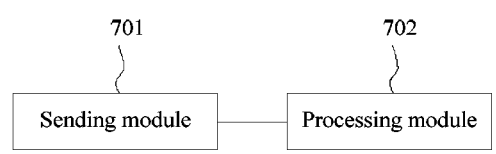
FIG. 20 is a module structure diagram in Embodiment 1 of user equipment according to embodiments of the present invention.

FIG. 20 is a module structure diagram in Embodiment 1 of user equipment according to embodiments of the present invention. As shown in FIG. 20, the user equipment includes:

a sending module 701, configured to send a first request message to a core network element, where the first message is used by the core network element to send an authentication request to a security function entity based on the first request message; and a processing module 702, configured to: perform Authentication and Key Agreement with the security function entity, and generate a security parameter, where the security parameter includes a first key.

The processing module 702 is further configured to generate a security key between the UE and the core network element based on the first key.

Figure 21:
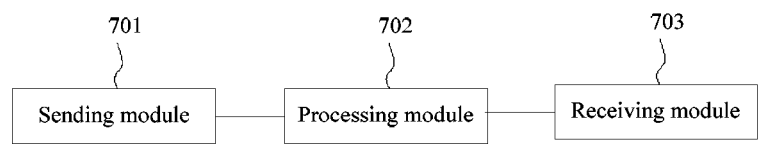
FIG. 21 is a module structure diagram in Embodiment 2 of user equipment according to embodiments of the present invention.

FIG. 21 is a module structure diagram in Embodiment 2 of user equipment according to embodiments of the present invention. As shown in FIG. 21, the user equipment further includes:

a receiving module 703, configured to receive first identification information sent by the security function entity, where the first identification information is generated by the security function entity when performing the Authentication and Key Agreement with the UE, and the first identification information is used to identify first security authentication between the UE and the security function entity.

In another embodiment, the sending module 701 is further configured to:

send a second request message to the core network element, where the second request message includes the first identification information, so that the core network element sends a key request to the security function entity based on the first identification information.

Figure 22:
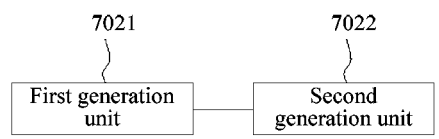
FIG. 22 is a module structure diagram in Embodiment 3 of user equipment according to embodiments of the present invention.

FIG. 22 is a module structure diagram in Embodiment 3 of user equipment according to embodiments of the present invention. As shown in FIG. 22, the processing module 702 includes:

a first generation unit 7021, configured to generate a second key of the core network element based on the first key; and a second generation unit 7022, configured to generate the security key between the UE and the core network element based on the second key.

Figure 23:
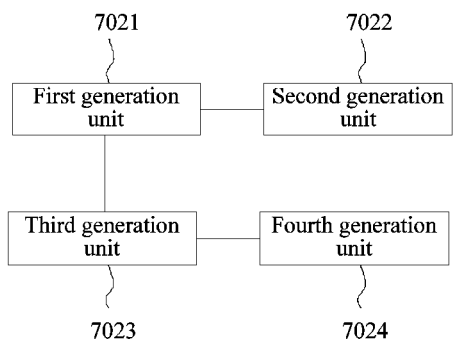
FIG. 23 is a module structure diagram in Embodiment 4 of user equipment according to embodiments of the present invention.

FIG. 23 is a module structure diagram in Embodiment 4 of user equipment according to embodiments of the present invention. As shown in FIG. 23, the processing module 702 further includes:

a third generation unit 7023, configured to generate the second key of the core network element based on the first key and an identifier of the core network element; and a fourth generation unit 7024, configured to generate the security key between the UE and the core network element based on the second key.

Figure 24:
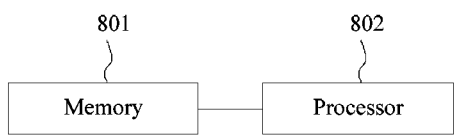
FIG. 24 is a module structure diagram in Embodiment 5 of a security function entity according to embodiments of the present invention.

FIG. 24 is a module structure diagram in Embodiment 5 of a security function entity according to embodiments of the present invention. As shown in FIG. 23, the security function entity includes:

a memory 801 and a processor 802.

The memory 801 is configured to store a program instruction, and the processor 802 is configured to call the program instruction in the memory, to perform the following method:

receiving an authentication request sent by a core network element, where the authentication request is generated by the core network element based on a request message of user equipment UE;

performing Authentication and Key Agreement with the UE based on the authentication request, and generating a security parameter, where the security parameter includes a first key;

receiving a key request sent by the core network element; and generating a security key between the core network element and the UE based on the key request and the first key.

Further, the security parameter further includes first identification information, where the first identification information is used to identify first security authentication between the UE and the security function entity.

Further, the security parameter further includes first identification information, where the first identification information is used to identify first security authentication between the UE and the security function entity, and the first identification information includes address information of the security function entity corresponding to the first security authentication.

Further, the processor 802 is further configured to send the first identification information to the UE.

Further, the processor 802 is further configured to generate a security key between the MM and the UE based on the first key.

Further, the processor 802 is further configured to generate the security key between the MM and the UE based on the first key and an identifier of the MM, where the identifier of the MM is sent by the MM to the security function entity by using the key request.

Further, the processor 802 is further configured to: generate a second key of the MM, and send the second key of the MM to the MM, so that the MM generates the security key between the MM and the UE based on the second key of the MM.

Further, the processor 802 is further configured to generate a security key between the SM and the UE based on the first key.

Further, the processor 802 is further configured to generate the security key between the SM and the UE based on the first key and an identifier of the SM, where the identifier of the SM is sent by the SM to the security function entity by using the key request.

Further, the processor 802 is further configured to receive the key request sent by the SM, where the key request includes the first identification information, and the first identification information is sent by the UE to the SM.

Further, the processor 802 is further configured to generate a security key between the SM and the UE based on the first key and the first identification information.

Further, the processor 802 is further configured to generate the security key between the SM and the UE based on the first key, the first identification information, and an identifier of the SM, where the identifier of the SM is sent by the SM to the security function entity by using the key request.

Further, the processor 802 is further configured to: generate a second key of the SM, and send the second key of the SM to the SM, so that the SM generates the security key between the SM and the UE based on the second key of the SM.

Figure 25:
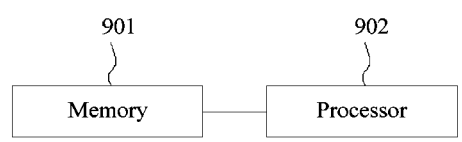
FIG. 25 is a module structure diagram in Embodiment 4 of a core network element according to embodiments of the present invention.

FIG. 25 is a module structure diagram in Embodiment 4 of a core network element according to embodiments of the present invention. As shown in FIG. 25, the core network element includes:

a memory 901 and a processor 902.

The memory 901 is configured to store a program instruction, and the processor 902 is configured to call the program instruction in the memory, to perform the following method:

receiving a request message sent by UE;

determining, according to a preset policy, whether security authentication needs to be performed on the UE; and performing security negotiation based on a determining result, and obtaining a security key between the core network element and the UE.

Further, the request message includes first identification information, where the first identification information is used to identify first security authentication between the UE and a security function entity.

Further, the request message includes first identification information, where the first identification information is used to identify first security authentication between the UE and a security function entity, and includes address information of the security function entity corresponding to the first security authentication.

Further, the processor 902 is further configured to: if the core network element determines that the security function entity corresponding to the first security authentication can be trusted:

send a key request to the security function entity corresponding to the first security authentication, so that the security function entity corresponding to the first security authentication generates a second key of the core network element based on the key request; and generate the security key between the core network element and the UE based on the second key of the core network element.

Further, the processor 902 is further configured to: if the core network element determines that the security function entity corresponding to the first security authentication cannot be trusted:

send an authentication request to a first security function entity, so that the first security function entity performs Authentication and Key Agreement with the UE based on the authentication request;

send a key request to the first security function entity, so that the first security function entity generates a second key of the core network element based on the key request; and generate the security key between the core network element and the UE based on the second key of the core network element.

Figure 26:
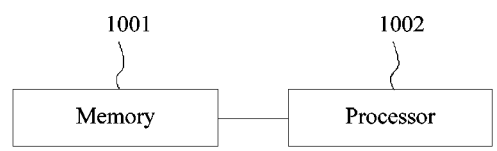
FIG. 26 is a module structure diagram in Embodiment 5 of user equipment according to embodiments of the present invention.

FIG. 26 is a module structure diagram in Embodiment 5 of user equipment according to embodiments of the present invention. As shown in FIG. 26, the user equipment includes:

a memory 1001 and a processor 1002.

The memory 1001 is configured to store a program instruction, and the processor 1002 is configured to call the program instruction in the memory, to perform the following method:

sending a first request message to a core network element, where the first message is used by the core network element to send an authentication request to a security function entity based on the first request message;

performing Authentication and Key Agreement with the security function entity, and generating a security parameter, where the security parameter includes a first key; and generating a security key between the UE and the core network element based on the first key.

Further, the processor 1002 is further configured to receive first identification information sent by the security function entity, where the first identification information is generated by the security function entity when performing the Authentication and Key Agreement with the UE, and the first identification information is used to identify first security authentication between the UE and the security function entity.

Further, the processor 1002 is further configured to send a second request message to the core network element, where the second request message includes the first identification information, so that the core network element sends a key request to the security function entity based on the first identification information.

Further, the processor 1002 is further configured to: generate a second key of the core network element based on the first key, and generate the security key between the UE and the core network element based on the second key.

Further, the processor 1002 is further configured to: generate a second key of the core network element based on the first key and an identifier of the core network element, and generate, by the UE, the security key between the UE and the core network element based on the second key.

Finally, it should be noted that the foregoing exemplary embodiments are merely intended for describing exemplary technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

Additionally, statements made herein characterizing the invention refer to an embodiment of the invention and not necessarily all embodiments.

What is claimed is:

1. A security negotiation method, comprising:
 receiving, by a security function entity, an authentication request from a first core network element, wherein the first core network element is a mobility management function entity (MM);
 performing, by the security function entity, Authentication and Key Agreement with a user equipment (UE) based on the authentication request;
 generating, by the security function entity, a security parameter comprising a first key;
 receiving, by the security function entity, a first key request from the MM;
 generating, by the security function entity, a security key between the MM and the UE based on the first key request and the first key;
 receiving, by the security function entity, a second key request from a second core network element, wherein the second core network element is a session management function entity (SM); and
 generating, by the security function entity, a security key between the SM and the UE based on the second key request, an identifier of the SM, and the first key.

2. The method according to claim 1, wherein the security parameter further comprises first identification information for identifying a first security authentication between the UE and the security function entity.

3. The method according to claim 2, wherein the first identification information comprises address information of the security function entity corresponding to the first security authentication.

4. The method according to claim 2, further comprising:
 sending, by the security function entity, the first identification information to the UE.

5. A security negotiation method, comprising:
 sending, by a user equipment (UE), a first request message to a first core network element, wherein the first core network element is a mobility management function entity (MM);
 performing, by the UE, Authentication and Key Agreement with a security function entity;
 generating, by the UE, a security parameter comprising a first key;
 generating, by the UE, a security key between the UE and the MM based on the first key; and
 generating, by the UE, a security key between the UE and a second core network element based on the first key and an identifier of the second core network element, wherein the second core network element is a session management function entity (SM).

6. The method according to claim 5, further comprising:
 receiving, by the UE, first identification information from the security function entity, wherein the first identification information is for identifying a first security authentication between the UE and the security function entity.

7. The method according to claim 6, further comprising:
 sending, by the UE, a second request message to the SM, wherein the second request message comprises the first identification information.

8. The method according to claim 5, wherein generating the security key between the UE and the SM based on the first key comprises:
 generating, by the UE, a second key of the SM based on the first key and the identifier of the SM; and
 generating, by the UE, the security key between the UE and the SM based on the second key.

9. A security function entity, comprising a processor and a memory having processor-executable instructions stored thereon, wherein the processor-executable instructions, when executed by the processor, facilitate:
 receiving an authentication request from a first core network element, wherein the first core network element is a mobility management function entity (MM);
 performing Authentication and Key Agreement with a user equipment (UE) based on the authentication request;
 generating a security parameter comprising a first key;
 receiving a first key request from the MM;
 generating a security key between the MM and the UE based on the first key request and the first key;
 receiving a second key request from a second core network element, wherein the second core network element is a session management function entity (SM); and
 generating a security key between the SM and the UE based on the second key request, an identifier of the SM, and the first key.

10. The security function entity according to claim 9, wherein the security parameter further comprises first identification information, wherein the first identification information is for identifying a first security authentication between the UE and the security function entity.

11. The security function entity according to claim 10, wherein the first identification information comprises address information of the security function entity corresponding to the first security authentication.

12. The security function entity according to claim 9, wherein the processor-executable instructions, when executed, further facilitate:
 sending the first identification information to the UE.

13. A user equipment (UE), comprising a processor and a memory having processor-executable instructions stored thereon, wherein the processor-executable instructions, when executed by the processor, facilitate:
 sending a first request message to a first core network element, wherein the first core network element is a mobility management function entity (MM);
 performing Authentication and Key Agreement with a security function entity;
 generating a security parameter comprising a first key;
 generating a security key between the UE and the MM based on the first key; and
 generating a security key between the UE and a second core network element based on the first key and an identifier of the second core network element, wherein the second core network element is a session management function entity (SM).

14. The user equipment according to claim 13, wherein the processor-executable instructions, when executed, further facilitate:
 receiving first identification information from the security function entity, wherein the first identification information is for identifying a first security authentication between the UE and the security function entity.

15. The user equipment according to claim 13, wherein generating the security key between the UE and the SM comprises:
   generating a second key of the SM based on the first key and the identifier of the SM; and
   generating the security key between the UE and the SM based on the second key.

16. A non-transitory computer readable medium having processor-executable instructions stored thereon, wherein the processor-executable instructions, when executed, facilitate:
   sending a first request message to a first core network element, wherein the first core network element is a mobility management function entity (MM);
   performing Authentication and Key Agreement with a security function entity;
   generating a security parameter comprising a first key;
   generating a security key between the UE and the MM based on the first key; and
   generating a security key between the UE and a second core network element based on the first key and an identifier of the second core network element, wherein the second core network element is a session management function entity (SM).

* * * * *